2,904,395
Patented Sept. 15, 1959

2,904,395

METHOD FOR PRODUCING ZINC FERRITE PIGMENT

Charles Donald Downs, Newtown, Pa., and John Martin, Hamilton Square, N.J., assignors to Columbian Carbon Company, New York, N.Y., a corporation of Delaware No Drawing. Application February 24, 1955
Serial No. 490,428

7 Claims. (Cl. 23—50)

This invention relates to a novel pigmentary ferrite and to a method of making the new pigment.

Finely divided ferrites have been extensively used as pigments or colorants because of their stability with respect to heat, alkali and acids and the generally pleasing colors obtained through their use. However, due to their usual ferromagnetic properties, they are frequently incompatible with other pigments, particularly non-ferromagnetic pigments. This incompatibility is evidenced by flocculation, separation, floating, flooding, mottling, and striation, in paints, or the like. Also, previously available ferrite pigments have usually been red or of a dark color and have been contaminated with substantial proportions of water-soluble salts. This contamination has limited their usefulness in certain types of paint, i.e., emulsion paints, and other products sensitive to such salts.

The present invention provides a new and improved ferrite pigment which is free from these objectionable characteristics of previously known ferrite pigments and which has a highly desirable light color.

We have discovered that, by intimately mixing ferric oxide ($Fe_2O_3$), and zinc oxide (ZnO) together in aqueous slurry, in carefully regulated proportions, to form a homogeneous mixture, drying, and heating the dried mixture in the presence of a catalyst, as hereinafter described, we can produce a zinc ferrite which is readily reduced to a fine powder having an improved yellow mass tone and a strength and yellowness of tint superior to any heretofore available ferrite pigment, of which we are aware. The resultant pigment is exceptionally stable with respect to heat, alkali and acids and it has the further advantages of being non-ferromagnetic and highly compatible with other non-ferromagnetic materials. This new pigment has the still further advantage of being substantially free from water-soluble salts.

This new pigment may be prepared in accordance with our present invention, as previously noted, by intimately mixing ferric oxide and zinc oxide with water to form a homogeneous aqueous slurry, thereafter dewatering the slurry, as by filtering, drying at a temperature of about 100° C., e.g. 100° to 125° C., calcining the mixture in the presence of a catalyst at a temperature within the range of 750° to 1,000° C. for a period of 10 to 30 minutes, then slowly cooling the reaction product to a temperature of about 400° to 500° C. and thereafter grinding it to a fine powder.

In carrying out the process, it is essential that the reaction between the ferric oxide and the zinc oxide be completed as rapidly and as uniformly as possible within the prescribed temperature range. If the time-temperature cycle is not carefully controlled, crystal growth, sintering and a considerable loss in oxygen will result.

We have found that the reaction may be caused to proceed with the necessary rapidity, and the above-noted objectionable conditions avoided, by carrying out the reaction in the presence of a chloride catalyst which is volatile at the calcining temperature, for instance, hydrogen chloride, or a metal chloride. Most any metal chloride may be used for this purpose. However, we have, with particular advantage, used zinc chloride. These chlorides are readily volatilized in the furnace leaving little or no trace thereof in the finished zinc ferrite.

The proportion of catalyst used need not exceed 1%, though somewhat larger minor proportions may be used. Where zinc chloride is used as the catalyst, proportions within the range of 0.1% to 1%, based on the weight of the dry solids, may be used with advantage. Equivalent proportions of other such volatile chloride catalysts may be used.

The reaction proceeds, according to the formula $Fe_2O_3 + ZnO \rightarrow ZnFe_2O_4$, and it is essential that no excess of zinc oxide be present in the reaction mixture. Best results are obtained where a very slight excess of $Fe_2O_3$ is used, i.e., an excess within the range of 0.4% to 0.6% by weight of $Fe_2O_3$. These proportions should be accurately controlled within plus or minus 0.1%.

We have found that, when the reaction is carried out in the presence of air, there is a tendency toward a slight loss in oxygen from the reaction mixture. If this oxygen loss is not carefully prevented or controlled, an equivalent amount of the ferric oxide is thereby reduced to the black ferrosoferric oxide, the presence of which is detrimental to the color of the zinc ferrite. To obtain a product with a clean bright yellow color, it is necessary to prevent this loss of oxygen, or else to provide for the reoxidation of the reduced material. We have found that by carrying out the reaction in an atmosphere of oxygen, instead of air, a clean bright product is directly obtained.

In place of ferric oxide, one may use an equivalent proportion of ferric oxide hydrate or iron carbonate. Also an equivalent proportion of zinc carbonate may be substituted for the zinc oxide. Where the oxide hydrate or the carbonate is used, the water or carbon dioxide is volatilized and driven off in the calcining operation along with the chloride catalyst.

After the reaction has been completed, the resultant zinc ferrite should preferably be permitted to cool, uniformly and slowly, from the furnace temperature to a temperature of about 400° to 500° C., advantageously while being maintained in an atmosphere of oxygen. This cooling operation has been carried on most successfully by passing the zinc ferrite from the furnace slowly through an electrically heated screw conveyor with the temperature and speed of the conveyor adjusted so as to permit the desired extent of cooling in a time period of about 10 minutes, e.g., 8 to 12 minutes.

We have found that, where the zinc ferrite is suddenly cooled, some reduced iron is formed with objectionable effect on the color of the pigment. This effect may be avoided by maintaining the zinc ferrite in an oxidizing atmosphere while it is permitted to cool slowly, as indicated above, to a temperature of about 400° to 500° C.

The invention will be illustrated by the following specific examples. It will be understood, however, that the invention is not restricted to the specific embodiment thereof thus exemplified.

*Example I*

185 pounds of ferric oxide hydrate was mixed with water to form a slurry containing about 15% solids by weight. This slurry, after thorough mixing, was passed through a fine screen to insure complete dispersion and freedom from aggregates. A second slurry was prepared, as described above, from 82 pounds of zinc oxide. These two slurries were then combined and thoroughly mixed for several hours.

A small sample of the resultant homogeneous slurry was then withdrawn and analyzed for $Fe_2O_3$ and ZnO, in order to be sure that the two reactants were present in the necessary proportions. Since these proportions should be controlled to an accuracy of plus or minus 0.1%, which is barely within the accuracy of the chemical analysis, it is usually desirable to analyze several samples of the composite slurry as a check. The proportions of the two reactants are then adjusted by the addition of iron oxide, or zinc oxide, according to the results of these analyses.

After the proportions of ferric oxide and zinc oxide have been carefully checked and accurately adjusted, the slurry was then dewatered by filtering, and treated with an aqueous solution of zinc chloride, containing 0.5% of $ZnCl_2$ on the weight of the dry solid, and the solid was extruded in the form of small rods or pellets approximately 1 inch long by ¼ inch in diameter. These rods were then dried at a temperature of 100° C.

After drying, the pellets were fed into a gas fire rotary furnace heated to a temperature of 850° C. and thus heated for a period of about 20 minutes. The discharge from the furnace was passed through a low speed screw conveyor, electrically heated, so as to permit the zinc ferrite to cool slowly from the furnace temperature to a final discharge temperature of about 400° C. in about ten minutes. The discharge from this conveyor was then ground to a fine powder in a grinding mill.

The product resulting from the above procedure was a clean, bright, orange-yellow powder which analyzed as follows:

| | |
|---|---|
| $Fe_2O_3$ _____percent__ | 66.80 |
| ZnO _____do____ | 32.70 |
| Percent ignition loss _____ | None |
| Water-soluble salts _____percent__ | 0.03 |
| Specific gravity _____ | 5.24 |

An X-ray diffraction analysis showed the crystals to be cubic with a typical spinel structure, and having a lattice constant of 8.35 A. and a calculated density of 5.34.

These particles were shown by the electron microscope to be acicular with a length of 0.4 to 1 micron and a diameter of 0.1 to 0.2 micron.

As previously noted an equivalent proportion of a corresponding carbonate may be substituted for the oxide, the carbonate being decomposed to the oxide in the early stage of the calcining operation.

Instead of using the oxides or carbonates, our improved zinc ferrite may be prepared using equivalent proportions of iron sulfate and zinc sulfate as the starting materials and converting the sulfates to the corresponding carbonates after mixing the two. This procedure is illustrated by the following example.

*Example II*

An aqueous solution was prepared from 61 pounds of $FeSO_4 \cdot 7H_2O$, 29 pounds of $ZnSO_4 \cdot 7H_2O$ and 360 pounds of water. This solution was carefully analyzed and adjusted to the necessary equivalent proportions as in the preceding example.

The solution was then heated to 75° C. and a solution of sodium carbonate added in an amount sufficient to precipitate completely all of the iron and zinc present, as the corresponding carbonates. Following precipitation, the heating at 75° C. was continued until there was no further evolution of carbon dioxide. The precipitate was then dewatered, washed free of soluble salts and dried at 100° C.

The dried lumps were then heated for 20 to 30 minutes in a furnace at a temperature of 800° C. in an atmosphere of oxygen containing a small amount of hydrogen chloride. The hydrogen chloride was supplied to the furnace by bubbling the oxygen through hydrochloric acid as it passed to the furnace, thus picking up sufficient hydrogen chloride to catalyze the reaction.

After the reaction has been completed, the resultant zinc ferrite was permitted to cool slowly, over a period of about ten minutes, to a temperature of 500° C. while remaining in the furnace in the oxygen atmosphere. The resultant zinc ferrite was then readily ground to produce a soft, orange-yellow powder having an analysis and crystal structure substantially the same as that of the preceding example.

While we do not propose to be bound by any theory, it presently appears that the negligible water-soluble salt content of our improved pigment is due to characteristics peculiar to the zinc salts. Since practically all synthetic iron oxides, hydrates, and the like are derived from iron sulfate, they all contain some basic sulfate which cannot be removed by washing with water. When these iron compounds are used to prepare ferrites, this basic salt is decomposed in the furnace and sulfur trioxide is released. Where magnesium oxide, for instance, is present, the sulfur trioxide released from the basic iron sulfate reacts with the $MgO \rightarrow (MgO + SO_3 \rightarrow MgSO_4)$ to form magnesium sulfate which is stable at the furnace temperature and is retained in the final product, usually to the extent of 0.3% to 0.6%.

However, in the preparation of zinc ferrite, in accordance with our present invention, any zinc sulfate which might be formed by reaction of the zinc oxide with liberated sulfur trioxide, is decomposed on further heating, according to the reaction $ZnSO_4 \rightarrow ZnO + SO_3$ thus releasing the sulfur trioxide to the atmosphere and leaving the final product substantially free from the water-soluble zinc sulfate. The ferrite pigment of our present invention contains less than 0.1% water-soluble salts.

In addition to being a superior colorant for paints, and the like, the pigment of our present invention is particularly suitable for compounding with rubber, and similar materials, and imparts superior heat stability and ageing properties to the rubber with which it is compounded.

Our improved zinc ferrite is entirely different physically from previously known zinc ferrite, especially with respect to color and texture. Zinc ferrite has heretofore been black in color and composed of irregular particles very hard, coarse and gritty in texture and entirely unsuited for pigmentary purposes. As distinguished therefrom the zinc ferrite pigment of our present invention is of soft texture, being composed of uniform needle-like particles, and ranges in color from a clear bright yellow to an orange-yellow, depending upon the amount of excess ferric oxide used in its production.

As previously noted, the pigment of our present invention is non-ferromagnetic. It is attracted very slightly by certain types of magnets, for instance, an Alnico magnet, and therefore might be classified as possessing paramagnetism, as distinguished from ferro-magnetism. However, such slight magnetic properties as it possesses does not deleteriously effect the compatibility of the pigment with other non-ferromagnetic pigments in paints or the like.

We claim:

1. Process for producing pigmentary zinc ferrite which comprises heating a homogeneous mixture of $Fe_2O_3$ and $ZnO_2$, containing an excess of $Fe_2O_3$ within the range of 0.4 to 0.6% by weight, to a temperature of 750° to 1,000° C. for a period of 10 to 30 minutes in the presence of a chloride catalyst selected from the group consisting of hydrogen chlorides and metal chlorides which are volatile at the treating temperature.

2. The process of claim 1 in which the mixture is heated in an atmosphere of oxygen.

3. Process for producing pigmentary zinc ferrite which comprises uniformly mixing $Fe_2O_3$ and $ZnO_2$ with water to form a homogeneous aqueous slurry, dewatering the slurry, drying the solids at a temperature of about 100° C. and heating the composite dried solids to a temperature within the range of 750° C. to 1,000° C. for a period of 10 to 30 minutes in the presence of a chloride catalyst selected from the group consisting of hydrogen chlorides and metal chlorides which are volatile at the treating temperature.

4. The process of claim 3 in which the chloride catalyst is zinc chloride.

5. The process of claim 3 in which the catalyst is hydrogen chloride.

6. The process of claim 1 in which the reaction product is slowly cooled from the furnace temperature to a temperature not in excess of 500° C. in an atmosphere of oxygen.

7. Process of claim 1 in which the reaction product is cooled from the furnace temperature to a temperature of 400° to 500° C. in a period of about 10 minutes in an oxidizing atmosphere.

References Cited in the file of this patent

UNITED STATES PATENTS 1,816,388    Mittasch et al. _____ July 28, 1931
2,549,089    Hegyi _____ Apr. 17, 1951

OTHER REFERENCES

Mellor: "Comprehensive Treatise on Inorganic and Theoretical Chemistry," vol. 13 (1934), pages 917-918.

Hackh's Chemical Dictionary, 3d ed., 1944, The Blakiston Co., Philadelphia.

Chemical Abstracts (1949), 8933h, D. W. Hopkins, J. Electrochem. Soc. 96, 195-203 (1949).

Chemical Abstracts (1950), 498 g., D. W. Hopkins, Bull. Inst. Mining Met. No. 515 1-21 (1949).

Chemical Abstracts (1953), 11064h, Isao Kushima et al. (Kyoto U.), Bull. Inst. Chem. Research, Kyoto University, 31, 215-16 (1953).

Heaton: "Outlines of Paint Technology," 1947, 3d ed., p. 10, Charles Griffen and Co. Limited.